(12) United States Patent
Pasquarella et al.

(10) Patent No.: US 7,614,806 B2
(45) Date of Patent: Nov. 10, 2009

(54) DAMPING SYSTEM FOR MECHANICAL SHUTTER

(75) Inventors: Stephen Pasquarella, Rochester, NY (US); Helen Yan, Victor, NY (US); Christopher Akuncius, Walworth, NY (US)

(73) Assignee: VA, Inc., Rochester, NY (US)

( * ) Notice: Subject to any disclaimer, the term of this patent is extended or adjusted under 35 U.S.C. 154(b) by 545 days.

(21) Appl. No.: 10/540,969

(22) PCT Filed: Jul. 17, 2003

(86) PCT No.: PCT/US03/22287

§ 371 (c)(1),
(2), (4) Date: Jun. 29, 2005

(87) PCT Pub. No.: WO2004/012005

PCT Pub. Date: Feb. 5, 2004

(65) Prior Publication Data

US 2006/0120715 A1    Jun. 8, 2006

(51) Int. Cl.
*G03B 9/08* (2006.01)
(52) U.S. Cl. .................. 396/453; 396/454; 396/456; 396/467; 396/469
(58) Field of Classification Search .................. 396/183, 396/443, 453, 454, 463, 497, 449, 456, 467, 396/469; 359/230; 335/267–279; 267/136; 352/170
See application file for complete search history.

(56) References Cited

U.S. PATENT DOCUMENTS 2,933,009 A * 4/1960 Vlahos .................... 352/170
3,427,576 A    2/1969 Vincent
3,533,345 A * 10/1970 Starp .................... 396/463
3,595,553 A    7/1971 Vincent (Continued)

FOREIGN PATENT DOCUMENTS

DE    694 08 355 1    8/1998

(Continued)

OTHER PUBLICATIONS

English translation of the German Office Action dated Jan. 8, 2009. Cover page + 11 pages. Cited on applicant's IDS of Jul. 17, 2009.*

(Continued)

*Primary Examiner*—Melissa J Koval
(74) *Attorney, Agent, or Firm*—Dominic P. Ciminello, Esq.; Stephen B. Salai, Esq.; Harter Secrest & Emery LLP (57) ABSTRACT

A damping system for an electromagnetically operable rotary shutter includes a damper for arresting the motion of a pivotally supported shutter actuating drive arm. The damper has a first portion composed of an ultrahigh density polyethylene and a second portion composed of a damped polyurethane that are arranged to strike one against the other during operation of the shutter. Moreover the first portion of the damper has a straight edge and the second portion has a surface that is curved so as to maintain substantially a point contact between the two portions throughout the duration of the impact between the two. The combination of materials and configuration of the surfaces of the two portions provides energy absorption while avoiding the adherence of the two portions upon impact.

22 Claims, 3 Drawing Sheets

U.S. PATENT DOCUMENTS

| | | | | |
|---|---|---|---|---|
| 3,618,500 | A | * 11/1971 | Douglas | 396/183 |
| 3,664,251 | A | 5/1972 | Vincent | |
| 3,967,293 | A | 6/1976 | Vincent | |
| 4,881,093 | A | * 11/1989 | Dowe | 396/463 |
| 5,365,298 | A | 11/1994 | Fox | 396/453 |
| 5,502,524 | A | * 3/1996 | Bovenzi et al. | 396/449 |
| 6,652,165 | B1 | * 11/2003 | Pasquarella et al. | 396/453 |
| 6,806,985 | B1 | * 10/2004 | Devenyi | 359/230 |
| 7,367,721 | B2 | * 5/2008 | Watson et al. | 396/453 |

FOREIGN PATENT DOCUMENTS

| | | |
|---|---|---|
| DE | 695 17 658 T2 | 2/2001 |
| EP | 0 716 961 B1 | 6/2000 |

OTHER PUBLICATIONS

English translation of Wie geschmiert. Allein order als Additiv: PE-UHMW verbessert Werkstoffeigenschaften. Cover + 6 pages.*

German Office Action dated Jan. 8, 2009, in corresponding German Patent Application No. 10392989.4 (7 pages).

Chemie Technik - Jahrgang 2001 (2 pages) http://www.chemietechnik.de/ct/10,2001.

Wie geschmiert. Allein order als Additiv: PE-UHMW verbessert Werkstoffeigenschaften (2 pages).

* cited by examiner

DAMPING SYSTEM FOR MECHANICAL SHUTTER

TECHNICAL FIELD

The present invention relates generally to dampers for lightweight mechanical assemblies and more particularly to a damper for a mechanical shutter such as a photographic shutter.

BACKGROUND ART

Mechanical assemblies having moving parts frequently require damping to protect the parts from damaging impacts and to increase the life and reliability of the assemblies. This is particularly true where the mechanical assembly is lightweight and the impact is repetitive and at a high rate of speed. Electrically operated lens shutters used in various types of photographic and laboratory equipment meet these criteria. For example, a shutter can open and close in a fraction of a second. Electronically operated shutters can operate at frequencies of 2 to 400 cycles per second and higher.

Lens shutters generally are of two types. In one type, a so called "guillotine" shutter has one or two thin, metal blades or leaves arranged to cover a lens opening. Pivot connections allow each blade to swing between a closed position where the blades cover the lens opening and an open position where the blades are drawn aside from the lens opening.

In a second type, a plurality of pivotally mounted blades, usually five, are arranged around the lens. Each blade is connected to a rotatable ring. In the operation of these rotary shutters, the rotation of the ring in one direction causes the blades to swing in unison to an open position. Counter rotation of the ring swings the blades to a closed position over the lens opening after exposure.

It is common in the first type of shutter to provide a shock absorber or damper that absorbs the impact as the blades are pivoted between the open and closed positions. In this respect, reference is made to U.S. Pat. No. 3,595,553 and No. 3,664,251, the disclosures of which are incorporated herein by reference. As disclosed in these references, the shock absorber operates to stop the shutter blade very rapidly, yet softly without damage and with little or no bounce. To Applicant's knowledge, a comparable shock absorbing system has not been used in connection with the rotating ring type of shutters.

One material known to have damping characteristics suitable for use in the damping system of photographic shutters is an ISOLOSS® high density molded product made by Aearo Company. The ISOLOSS® products are high density damped polyurethane thermoset polymers. Sheets and molded parts of this material have been used in a variety of applications relating to noise, shock and vibration reduction. The material has favorable hysteretic damping properties, good compliance and is able to absorb and store mechanical energy while effectively dissipating it in the form of heat.

Dampers made from this polyurethane molded material have been used for some time in combination with other materials such as metals and Teflon coated metal and have provided good results in some applications. However, one disadvantage of the polyurethane molded shock absorbing formulations is that they have a rubbery characteristic and tend to stick to the surfaces that they impact while performing the damping function. In an attempt to remedy this, the impact surface often is coated with Teflon. A Teflon coated surface can reduce or eliminate the sticking when contacting the polyurethane molded damper, however, the Teflon coated surface introduces other problems. Teflon tends to scale and form a powdery residue somewhat like talcum powder in its consistency. In many applications the residue is not harmful but, in some applications, such as optical shutters, the residue may find its way to the surfaces of optical components such as lenses. This powder on the surface of the lens is detrimental to the operation of the lens.

Accordingly, it is an object of the present invention to provide an improved damping system for photographic shutters and in particular, high speed rotary shutters.

Another object of the present invention is to provide a damping system employing a polyurethane molded damper that eliminates sticking of the damper to the impact surface.

A further object is to provide a damping system having an increased operational life.

DISCLOSURE OF INVENTION

In the present invention a rotary shutter is provided with a damping system wherein the swinging motion of the shutter drive arm through an arcuate path of travel is arrested by a detent positioned to engage a member carried by the drive arm. The member is a beam that is generally triangular in cross section. Fixed to each side of the beam is a damper formed of a highly damped polyurethane thermoset material. Impact of the dampers against the detent arrests the movement of the drive arm.

The impact surface of the detents comprises a bumper composed of an ultra high molecular weight polyethylene. This material, together with the shape and disposition of the bumper and damper provide a limited contact area. Having a limited contact area concentrates the impact energy and improves the efficiency of the damping system. When the damper is struck, the material at the point of impact undergoes a transformation from a glass phase to a rubber phase and it is the rubber phase that tends to stick to the impact surface. By limiting the area of contact to a line or more preferably a point contact, the potential "sticky" area is reduced to a minimum.

Accordingly, by careful selection of the shape, materials and arrangement of the damper and bumper, sticking is virtually eliminated. Life testing demonstrates that the components have a much greater life than heretofore achieved with other components. Damping characteristics of the combination are close to ideal for electromechanical shutters and likely for other applications in that the design essentially eliminates bounce or rebound after impact.

Accordingly, the present invention may be characterized in one aspect thereof by a damping system for arresting motion of a small mass such as a photographic shutter or the like driven by a drive arm mounted for swinging motion through an arcuate path of travel. The damping system includes a detent having opposite ends arranged to arrest motion of the arm at each end of the path of travel. In this respect the opposite ends of the detent carry bumpers formed of a high molecular weight polyethylene that are disposed to impact a damper on the drive arm, the damper being composed of a high density polyurethane thermoset material. Both the bumper and damper are shaped to provide substantially point contact during the duration of the engagement between the damper and the bumper.

BEST MODE(S) FOR CARRYING OUT THE INVENTION

Figure 1:
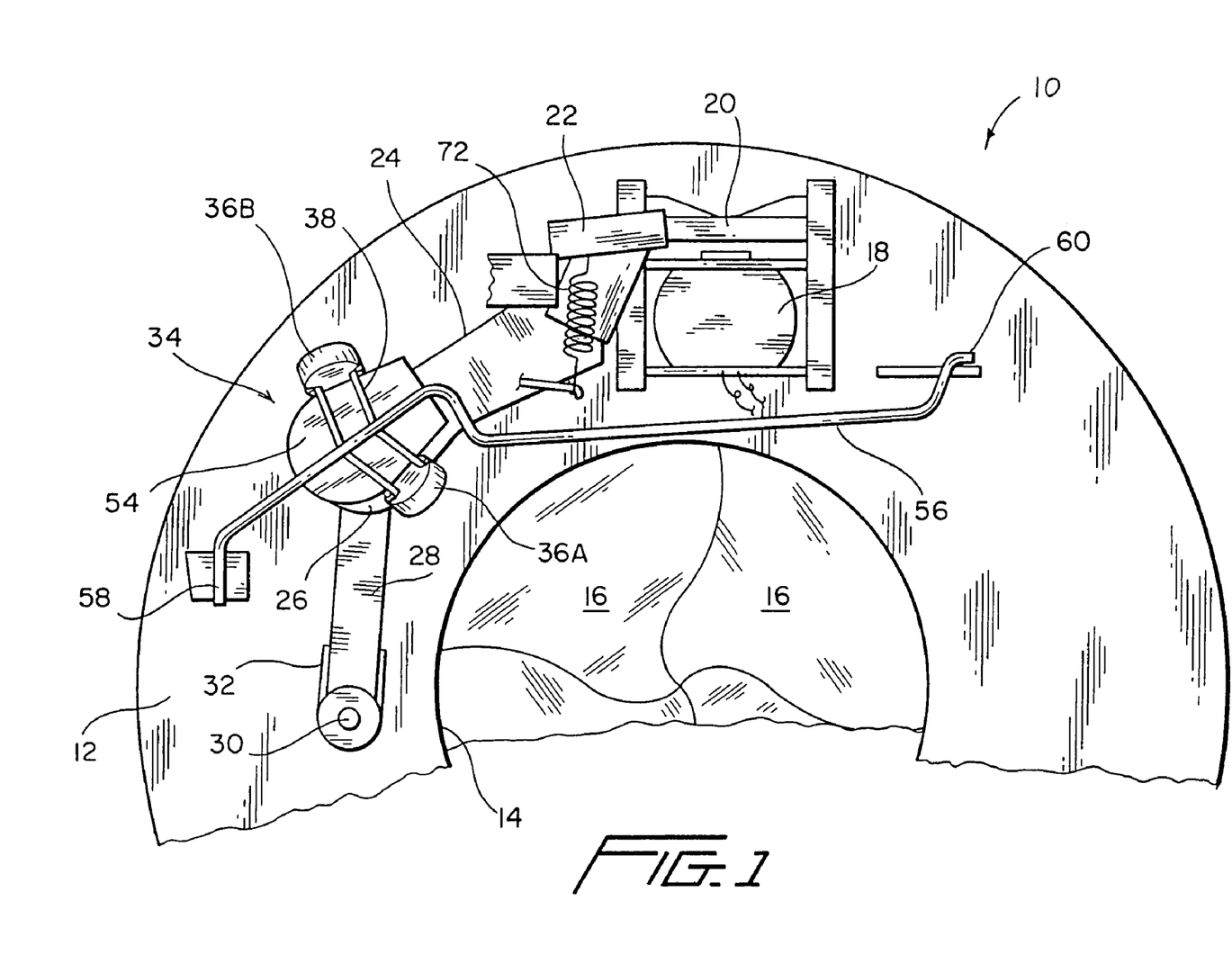
FIG. 1 is a front elevation view of a shutter incorporating the damping system of the present invention.

Referring to the drawings, FIG. 1 shows a rotary shutter generally indicated at 10 incorporating the damping system of the present invention. It should be appreciated that various components, brackets and wiring harnesses of the shutter assemble have been omitted for clarity. For purposes of orientation, the shutter includes a base plate 12 having a central aperture 14. Supported at the underside (not shown) of the base plate are a plurality of shutter blades 16, portions of which are seen through the aperture. The rotary shutter is conventional. It is sufficient for purposes of the present invention to say that the shutter blades are operatively attached to a driver plate (not shown) that rotates with respect to the base plate. Rotation of the driver plate in one direction moves the shutter blades aside and opens the aperture. Reciprocal rotation of the driver plate moves the shutter blades back to the position shown in FIG. 1 wherein the aperture is closed.

The means for operating the driver plate includes an electromagnetic actuator 18 mounted to the base plate. The actuator includes an armature 20 that engages a laterally extending rocker arm 22. The rocker arm engages a drive arm 24. The drive arm is flat and formed of very thin sheet metal to minimize mass and is pivotally supported so its end 26 moves in an arcuate path of travel. At its end 26, the drive arm is connected to a link 28. The link has a connector 30 that extends through an elongated opening 32 in the base plate for connection to the driver plate.

Figure 2:
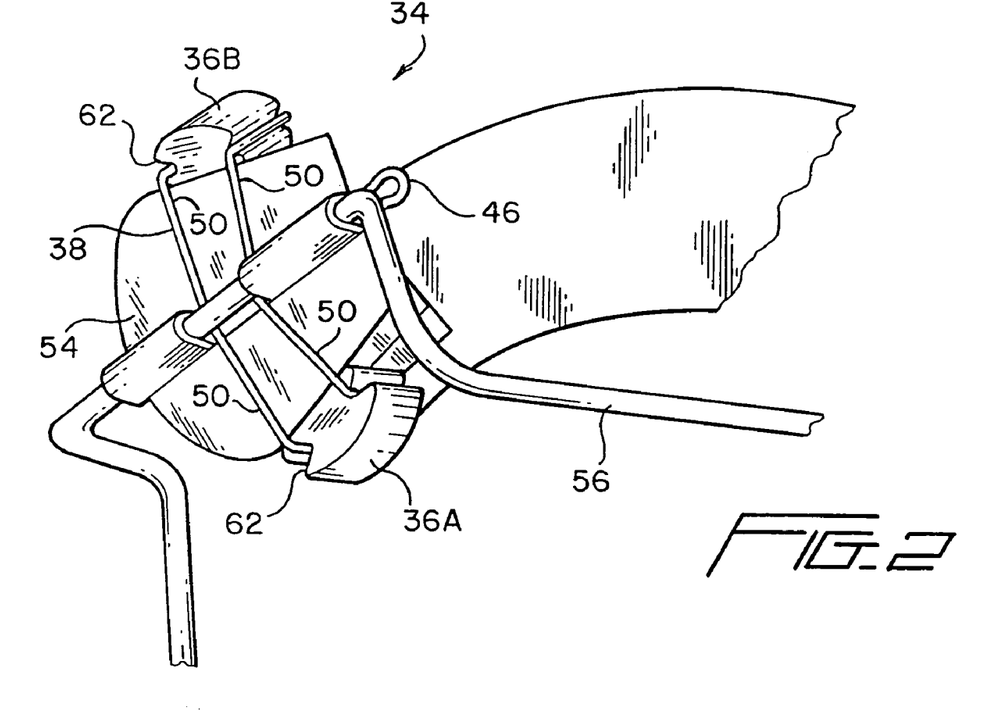
FIG. 2 is a perspective view on an enlarged scale of a portion of FIG. 1.
Figure 3:
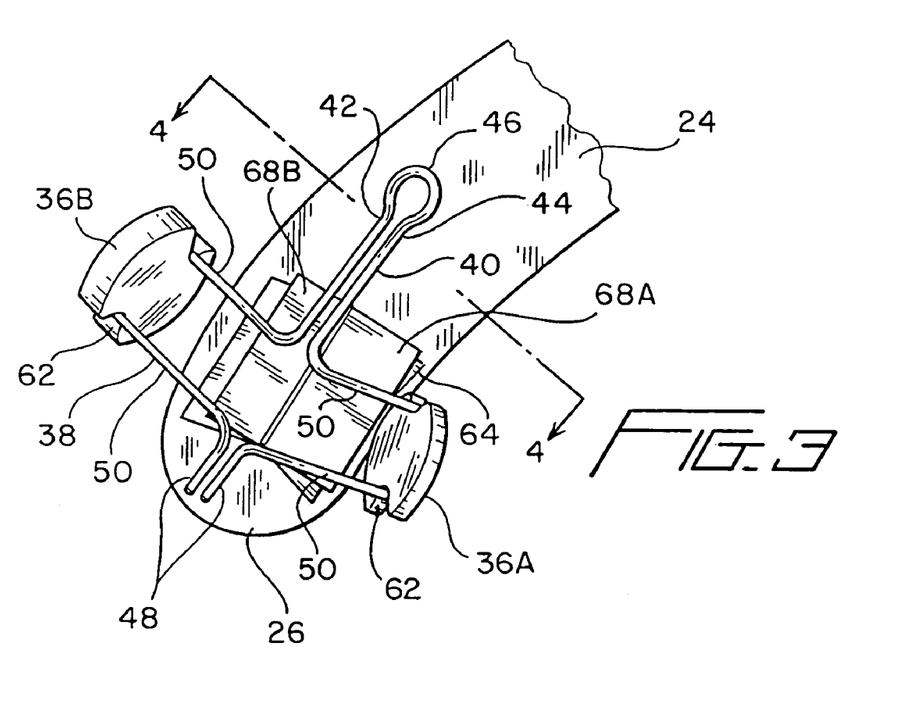
FIG. 3 is a plan view of the structure shown in FIG. 2 with portions removed for clarity.

The swinging movement of the drive arm 24 is damped by the damping system of the present invention generally indicated at 34. As best seen in FIGS. 2 and 3 the damping system includes a pair of bumpers 36 attached to a shaped spring wire 38. One of the bumpers is an inner bumper 36A and the outer is an outer bumper 36B.

Figure 4:
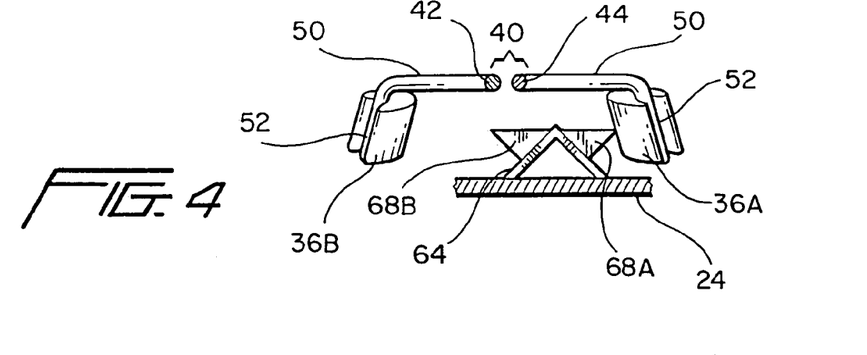
FIG. 4 is a view taken generally along lines 4-4 of FIG. 3.
Figure 5:
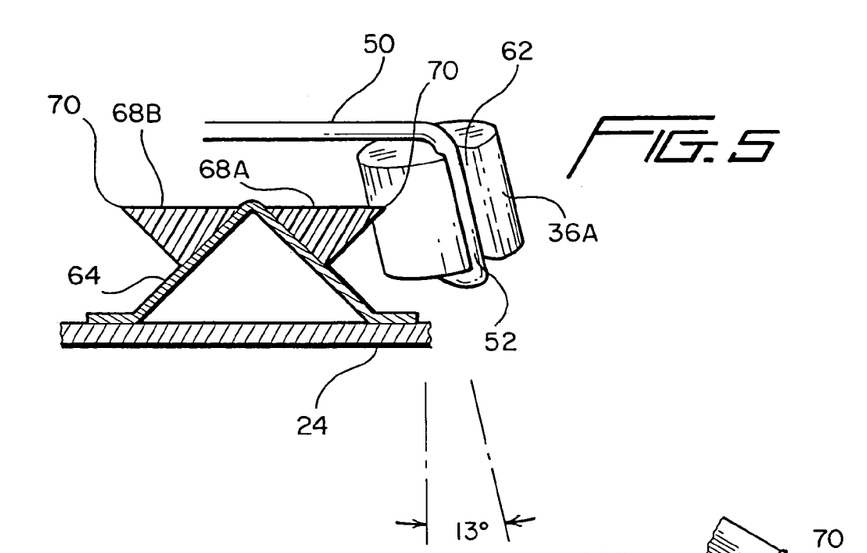
FIG. 5 is a view on an enlarged scale of a portion of FIG. 4 showing the disposition of components with the shutter in a closed position.

The spring wire that supports the bumpers preferably is formed of piano wire about 0.020 inches in diameter and is shaped to form a torsion spring. In this respect the spring wire is formed with a central spine 40 that is bifurcated (FIG. 3). The two portions 42, 44 of the bifurcated spine 40 are joined at one end 46 and are spaced apart and unjoined at an opposite end 48. Each of the two portions 42, 44 in turn is bent to form opposed, generally U-shaped arms 50 extending outward from the central spine 40. As best seen in FIGS. 4 and 5, the opposite ends 52 of the U-shaped arms are each bent downward from the plane of the central spine 40 and support the bumpers below the plane of the central spine 40.

As formed, the arms 50 of the spring wire are bent downwardly from the plane of the central spine 40. However, as shown in FIGS. 1 and 2, the spring wire 38 is carried by a stop plate 54 that is disposed beneath the arms and engages the arms to force them to assume an orientation that is closer to the plane of the spine. This pre-loads the arms 50 to provide a bias urging the arms to pivot downwardly from the plane of the central spine 40.

The stop plate in turn is rigidly fixed to a relatively heavy and rigid support wire 56. The support wire 56, with a diameter of 0.050 inches, is over twice the diameter of the spring wire 38. The ends 58, 60 of the support wire are fixed as rigidly as possible to the base plate 12 (FIG. 1) so as to minimize as much as possible the flexure of the support wire.

Figure 6:
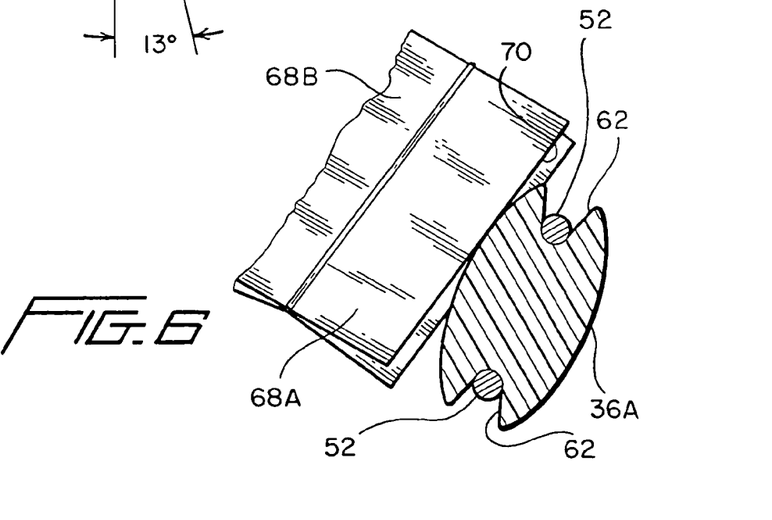
FIG. 6 is a view on an enlarged scale of a portion of FIG. 3.

As best seen in FIGS. 2, 3 and 6, each bumper 36 is generally oval in shape. The ends of the oval shape are each provided with a groove 62. These grooves receive the end 52 of the U-shaped arms for attaching the bumpers to the spring wire 38.

The damping system 34 is further shown in FIGS. 3, 4 and 5 to include components carried by the drive arm 24, which interact with the bumpers 36 and the spring wire 38. These components include a beam 64 that is fixed to a surface of the flat drive arm adjacent its end 26. The beam is generally triangular in cross section and the two upstanding sides or legs of the triangular beam extend upwardly from the drive arm and into the space between the downwardly bent ends 52 of the spring wire. Fixed to and extending outward from each of the upstanding legs is a damper 68. One of the dampers is an inner damper 68A and the other is an outer damper 68B. Each damper is generally triangular in cross section and is fixed to the beam such that a longitudinally extending corner 70 of each damper is disposed to contact one of the bumpers 36 (FIGS. 5 and 6).

In a start position with the shutter closed, the corner 70 of the inner damper 68A is in contact with the inner bumper 36A (FIGS. 4 and 6). To operate the shutter, the electromagnet 18 is energized and the armature 20, operating through the rocker arm 22, pivots the drive arm 24 so its end 26 is swung upwardly as viewed in FIG. 1. This pulls the connecting link 28 and rotates a driver plate (not shown) to open the shutter. Pivoting the drive arm carries the outer damper 68B forward and into contact with the outer bumper 36B wherein the engagement of one against the other arrests the motion of the drive arm. When the electromagnet is de-energized, a spring 72 returns the drive arm back to the start position to close the shutter. The return motion of the drive arm then is arrested by the engagement of the inner damper 68A against the inner bumper 36A.

In a shutter having an aperture of 45 mm the operating speed of the shutter can be up to 5 Hertz and the speed increases as the aperture size decreases. Operating speeds of up to 400 hertz or more are possible in shutters having an aperture of 2 mm. Accordingly, it is important to arrest the forward and reverse motion of the drive arm quickly, smoothly and with little or no bounce. Several aspects contribute to the successful operation of the damping system of the present invention. For example, one of the damper and bumper is formed of a highly damped polyurethane thermosetting resin that provides high performance damping, isolation, and shock and motion control with a loss factor in excess of 1.0. A preferred material is a urethane solid having the following properties:

Normal Hardness (ASTM D2240) Shore A Durometer Impact at 73° F. (23° C.) of about 58, Glass transition temperature (ASTM D575) of about 18° F. (−8° C.), Maximum loss factor at 10 Hz and 54° F. (12° C.) of about 0.94, Rebound (ASTM D2632) Bashore Resilience Rebound, 1st impact @ 20° C. of about 4.5%

Rebound, $2^{nd}$ impact @ 20° C. of about 0.0%,

Compression Load Deflection (ASTM D575)

10% Deflection about 82 psi (565 kPa)

20% Deflection about 180 psi (1241 kPa)

30% Deflection about 305 psi (2103 kPa)

Compression Modulus about 845 psi (5826 kPa).

A suitable material is ISOLOSS® HD made by Aearo Company.

The other of the damper and bumper is formed of an ultra high molecular weight polyethylene (UHMWPE) having a molecular weight in the range of 3 to 6 million. Such a material typically has a density of at least 0.930 g/cm$^3$ and up to 0.965 g/cm$^3$. Surprisingly, such a high molecular weight polyethylene provides effective damping when used together with the polyurethane despite the hardness of the polyethylene, which is considered a detriment to effective damping.

In a preferred arrangement the bumper is made of the UHMWPE whereas the damper is formed of the polyurethane. The polyethylene is extrudable to a desired shape of the bumper, as described hereinbelow, whereas the urethane material is not extrudable and must be molded to shape. Also, the urethane is readily attachable to the beam with an adhesive whereas an adhesive attachment of the polyethylene to the beam does not hold up over time and under the stress of repeated impacts.

The present invention also has the components of the damping system arranged to provide substantially point contact between bumper 36 and the damper 70 during the entire time interval of contact between the two. This is accomplished by providing the bumper with an oval shape as shown and the damper with a longitudinally extending corner 70. The arrangement of the straight corner 70 of the damper striking against the curved surface of the oval bumper (FIG. 6) maintains substantially point contact for the duration of the contact time. Limiting the engagement to substantially point contact improves the efficiency of the damping system.

A further contribution to the impact absorbing characteristics of the damping system results from the loading of the arms 50. As described above, the arms are loaded so they are biased in a downward direction. Accordingly an impact of a damper 68 against a bumper 36 that tends to rotate the arm 50 upwardly about the central spine is resisted by the downward bias of the arm. Furthermore, as shown in FIG. 5, each end 52 of the U-shaped arm 50 is bent downward at an angle of about 77° or within about 13° of a line perpendicular to the plane of the arm 50. This allows the impact of the damper to be partly absorbed by both an upward flexing in unison of the arm 50 and of the bifurcate central spine 40 of the spring wire. The angle is maintained to insure that the corner 70 of the damper strikes the approximate center of the bumper 36A so the two do not disengage as the bumper deflects upwardly against the resistance offered by the urging of the downward bias of the arm. The angle also prevents the adhesion of the two materials during the contact compression phase when the beam is moved causing the damper corner to impact the bumper.

While all the components as described cooperate to provide an effective damping system, it was found that forming the damper and bumper of polyurethane and high molecular weight polyethylene respectively contributed significantly to the effectiveness of the damper. In particular, these materials served to increase the operational life of the shutter by six times from one to six million operations while virtually eliminating the adhesion of the damper and bumper materials without the use of either anti-stick materials such as Teflon or lubricants.

The invention claimed is:

1. A rotary photographic shutter or the like comprising a plurality of shutter blades movable between an open and a closed position, an actuator, a linkage coupled between the actuator and the shutter blades for moving the shutter blades between the open and closed positions, and a damper engaging the linkage and isolated from contact with the shutter blades, the damper being operable to damp motion of the shutter blades without contacting them.

2. The rotary photographic shutter of claim 1, further comprising a bumper, the bumper and the damper being shaped to provide substantially point contact therebetween at the one of the open and closed positions.

3. The rotary photographic shutter of claim 1, wherein the linkage comprises a drive arm, and the damper is disposed on the drive arm and configured to engage a bumper supported by the base plate.

4. The rotary photographic shutter of claim 1, further comprising an inner bumper joined to an outer bumper by a biased connector.

5. The rotary photographic shutter of claim 4 wherein the biased connector comprises a spring wire, the spring wire being connected to a stop plate.

6. The rotary photographic shutter of claim 4, wherein the drive arm is configured to travel in an arcuate path between the inner bumper and the outer bumper.

7. The rotary photographic shutter of claim 4 further comprising an additional damper, the damper and the additional damper configured to travel in an arcuate path between the inner bumper and the outer bumper.

8. The rotary photographic shutter of claim 1 wherein the linkage configured to oscillate between an outer bumper and an inner bumper.

9. The rotary photographic shutter of claim 1 wherein the linkage is configured to pivot about an axis offset from a central axis of the rotary photographic shutter.

10. The rotary photographic shutter of claim 1 further including an outer bumper and an inner bumper, the outer and inner bumpers being substantially entirely disposed on one side of a shutter opening defined by the shutter blades.

11. A rotary photographic shutter comprising:
   a) a base plate having a central aperture;
   b) a rotating ring:
   c) a plurality of shutter blades supported by the base plate and coupled to the rotating ring for opening and closing the aperture;
   d) an actuator coupled to the rotating ring;
   e) a linkage coupled between the actuator and the rotating ring; and
   f) a damping system on the base plate engaging the linkage, isolated from contact with the shutter blades, and operable to dampen the opening and closing of the shutter blades.

12. The rotary photographic shutter of claim 11, wherein the linkage comprises:
   a) a drive arm pivotally supported on the base plate to swing back and forth through a defined arc, the swing of the drive arm in one direction acting to move the shutter blades to an open position and the swing in a return direction acting to move the shutter blades to a closed position; and
   b) wherein the damping system engages the drive arm for arresting the swing of the drive arm at each end of the arc.

13. A The rotary photographic shutter of claim 12 wherein the damping system comprises:
   a) a detent having opposite ends disposed to arrest the swinging movement of the drive arm at each end of the swing;
   c) bumpers on each of the opposite ends of the detent; and
   d) at least one damper on the drive arm positioned to strike and engage against each of the shaped bumpers at the limits of the swing of the drive arm.

14. The rotary photographic shutter of claim 13 wherein the bumpers and the damper are shaped to provide substantially point contact therebetween during the duration of the engagement.

15. A The rotary photographic shutter of claim 13 wherein the damping system comprises:
   a) bumpers carried by one of the drive arm and the base plate composed of a polyethylene having a molecular weight of 3 to 6 million; and
   b) a damper on the other of the drive arm and base plate composed of a polyurethane material that under goes a transformation from a glass phase to a rubber phase when it strikes the bumpers.

16. The rotary photographic shutter of claim 11 wherein the damping system comprises a bumper and a damper, the bumper and the damper being shaped to provide substantially point contact therebetween at one of an open position of the shutter blades and a closed position of the shutter blades.

17. The rotary photographic shutter of claim 16, wherein the linkage comprises a drive arm configured to assist in opening and closing the shutter blades, wherein the damper is disposed on the drive arm.

18. The rotary photographic shutter of claim 16 wherein the damping system comprises a first bumper and a second bumper, the damper being configured to travel between the first bumper and the second bumper.

19. A rotary photographic shutter, comprising:
   a) a plurality of shutter blades moveable between an open and closed position;
   b) a drive arm configured to move the shutter blades between an open position and a closed position; and
   c) a damping system comprising a bumper and a damper, one of the bumper and the damper being mounted on the drive arm, and the bumper and the damper being shaped to provide substantially point contact therebetween at the one of the open and closed positions
   wherein the bumper comprises an inner bumper and an outer bumper, the damper being configured to travel along a path between the inner bumper and the outer bumper.

20. The rotary photographic shutter of claim 19 wherein the path is an arcuate path.

21. A rotary photographic shutter, comprising:
   a) a plurality of shutter blades moveable between an open and closed position;
   b) a drive arm configured to move the shutter blades between an open position and a closed position; and
   c) a damping system comprising a bumper and a damper, one of the bumper and the damper being mounted on the drive arm, and the bumper and the damper being shaped to provide substantially point contact therebetween at the one of the open and closed positions wherein the damper comprises an inner damper connected to an outer damper.

22. A rotary photographic shutter, comprising:
   a) a plurality of shutter blades moveable between an open and closed position;
   b) a drive arm configured to move the shutter blades between an open position and a closed position; and
   c) a damping system comprising a bumper and a damper, one of the bumper and the damper being mounted on the drive arm, and the bumper and the damper being shaped to provide substantially point contact therebetween at the one of the open and closed positions wherein the damper is isolated from contact with the shutter blades.

* * * * *

UNITED STATES PATENT AND TRADEMARK OFFICE
CERTIFICATE OF CORRECTION

| | | |
|---|---|---|
| PATENT NO. | : 7,614,806 B2 | |
| APPLICATION NO. | : 10/540969 | |
| DATED | : November 10, 2009 | |
| INVENTOR(S) | : Stephen Pasquarella, Helen Yan and Christopher Akuncius | |

It is certified that error appears in the above-identified patent and that said Letters Patent is hereby corrected as shown below:

In column 1, line 46,
    after "shutters." insert --Instead it is believed that the common practice for rotating ring shutters has been to provide a spring that elongates as the shutters move to an open position. The elongation of the spring is intended to slow the travel of the shutter blades so their impact force at the maximum limit of travel is effectively reduced. Often however the inertia of the blades is sufficient to exceed the spring restraining force so the edges of the shutter blades move beyond a prescribed limit and forcibly strike adjacent structure.--.

In column 6, line 58,
    after "13." delete "A".

In column 6, line 65,
    before "bumpers" delete "c)" and insert --b)--.

In column 6, line 65,
    before "at least" delete "d)" and insert --c)--.

In column 7, line 21,
    after "blades," insert --and--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,614,806 B2 Page 1 of 1
APPLICATION NO. : 10/540969
DATED : November 10, 2009
INVENTOR(S) : Pasquarella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this

Nineteenth Day of October, 2010

David J. Kappos
*Director of the United States Patent and Trademark Office*